Nov. 10, 1959     G. A. PHELAN ET AL     2,912,636
GENERATOR PROTECTIVE SYSTEM
Filed July 25, 1956
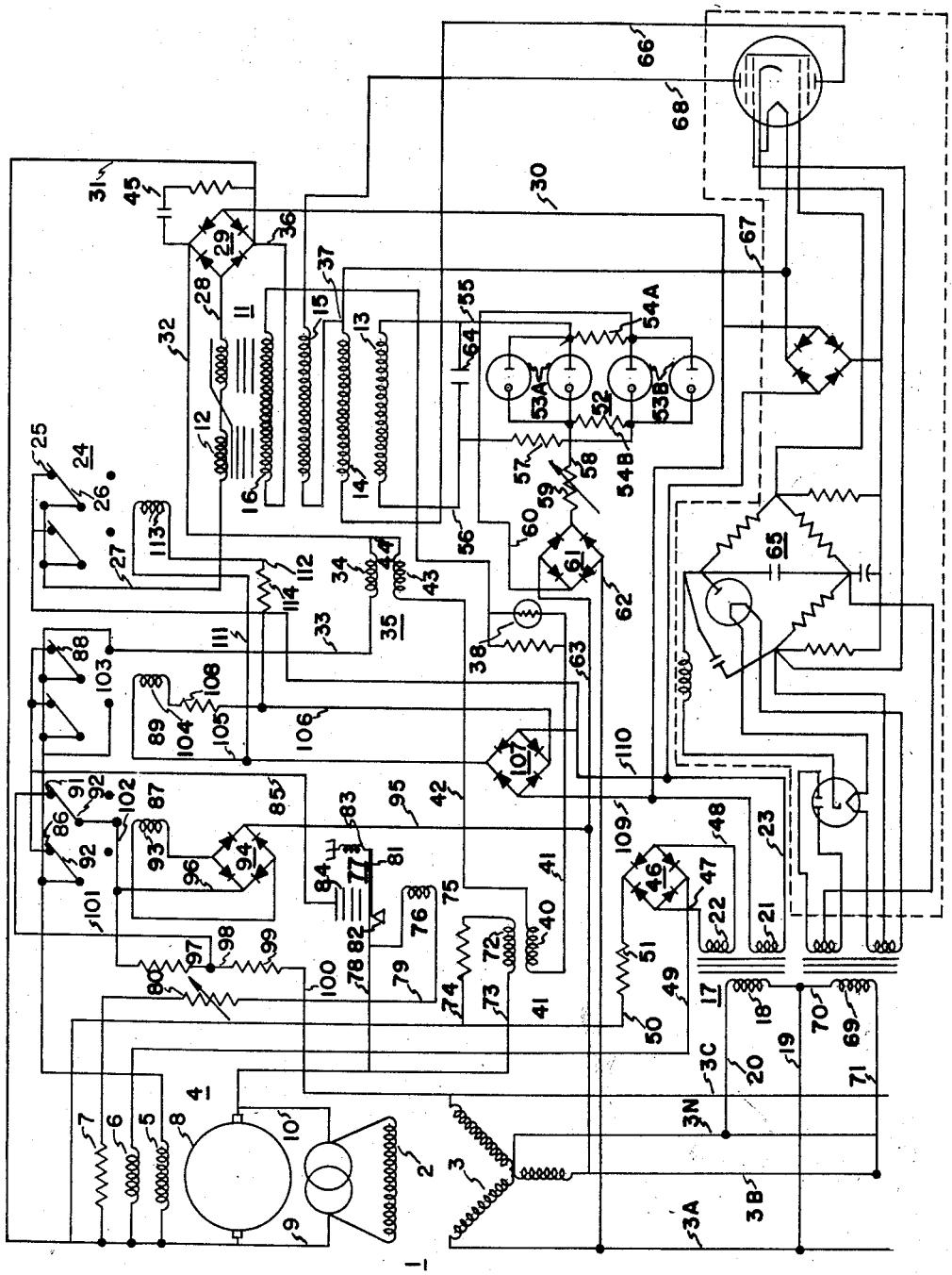
INVENTORS.
GEORGE A. PHELAN
FREDERICK M. POTTER
BY
*James M. Nickels*
ATTORNEY

United States Patent Office 2,912,636
Patented Nov. 10, 1959

2,912,636

GENERATOR PROTECTIVE SYSTEM

George A. Phelan, East Orange, and Frederick M. Potter, Westwood, N.J., assignors to Bendix Aviation Corporation, Eatontown, N.J., a corporation of Delaware Application July 25, 1956, Serial No. 600,132

4 Claims. (Cl. 322—37)

The present invention relates to generator regulating systems and more particularly to means for limiting the short circuit currents in such systems.

It is known that short circuits can cause exceedingly high currents in a generator system and can also cause exceedingly high peak voltages after the short has been removed.

The present invention provides means for limiting such short circuit currents to a safe value by providing means for limiting such currents to a safe value. Independent of generator speed, if the rotating field is held constant, the short circuit current is constant. A variable resistance is provided for controlling the rotating field current. A sensing circuit controls the value of the variable resistance to maintain the rotating field current constant.

It is an object of the invention to provide an improved protective means for a generator system.

Another object of the invention is to provide novel means for limiting short circuit currents in a generator.

Another object of the invention is to provide an improved generator system.

The above and other objects and features of the invention will appear more fully hereinafter from a consideration of the following description taken in connection with the accompanying drawing, wherein one embodiment is illustrated by way of example.

In the drawing the single figure is a schematic diagram of a regulating system embodying the invention.

Referring now to the drawing, an A.C. generator is indicated generally by the numeral 1 and includes a rotor winding 2 and a three phase stator winding 3. While a three phase winding has been illustrated, it is understood that it is not limited thereto. Output conductors 3A, 3B, 3C and 3N are connected to the stator windings 3. An exciter 4 is provided to energize the winding 2. The exciter 4 and winding 2 may be driven from any suitable source (not illustrated). The exciter 4 has a shunt field 5, bucking field 6 and ballast resistor 7, and armature winding 8. The output of the winding 8 is connected by conductors 9 and 10 through conventional slip rings to the winding 2.

The energization of the winding 5 is controlled by a magnetic amplifier 11 of the series reactor type. The amplifier 11 has an alternating current winding 12, a main control winding 13, trimmer windings 14 and 15, and feedback winding 16. The amplifier 11 may be of the toroidal type.

A transformer 17 has a primary winding 18 connected by conductors 19 and 20 across output conductors 3A and 3N. The transformer 17 has secondary windings 21 and 22. One side of the winding 21 is connected by conductor to contacts 25 of a relay 24 through switch arm 26 and conductor 27 to one side of the winding 12 of the reactor 11. The other side of the winding 12 is connected by conductor 28 to one input terminal of a rectifier 29. The other input terminal of the rectifier 29 is connected by conductor 30 to the other side of the winding 21 of the transformer 17.

One output terminal of the rectifier 29 is connected by a conductor 31 to the side of the winding 5 which is connected to one side of the winding 6 and ballast resistor 7. The other output terminal of the rectifier 29 is connected by conductor 32 and 33 in series with a winding 34 of a transformer 35 to the other side of the winding 5. One end of feedback winding 16 is connected by conductor 36 to the same output terminal of rectifier 29 as the conductor 31. The other end of the winding 16 is connected by conductor 37, temperature compensating network 38, conductor 39, winding 40 of a transformer 41, conductor 42, winding 43 of the transformer 35, conductor 44 and conductor 32 to the other output terminal of the rectifier 29. A stabilizing network 45 may be connected across the output of the rectifier 29.

A rectifier 46 is connected by conductors 47 and 48 across the winding 22 of the transformer 17. One output terminal of the rectifier 46 is connected by conductor 49 to one side of the bucking winding 6. The other output terminal of the rectifier is connected by conductor 50 to the other side of the winding 6. A resistor 51 may be provided in the conductor 50 to limit the current in the winding 6.

The main control winding 13 of the magnetic amplifier 11 is energized by a bridge circuit 52 which has voltage regulator tubes 53A and resistor 54A in one leg and tubes 53B and resistor 54B in the other leg. The bridge 52 has one output terminal connected by conductor 55 to one side of the winding 13 and the other output terminal connected by conductor 56 to the other side of the winding 13. A resistor 57 may be inserted in the conductor 56. The input terminals of the bridge 52 are connected by conductor 58, resistor 59 and conductor 60 across the output of a rectifier 61. The rectifier 61 is energized from the output of the generator 1 by being connected by conductors 62 and 63 across output lines 3A and 3B. A capacitor 64 may be connected across the output of the bridge 52.

Trimmer windings 14 and 15 of the amplifier 11 are connected across the output of an electronic sensing circuit 65 by conductors 66, 67 and 68. The circuit 65 is described and claimed in Emerson U.S. Patent No. 2,611,121 and a detailed description thereof will be omitted here for the sake of brevity. The circuit 65 is energized from the output of the machine 1 by a transformer 69 connected by conductors 70 and 71 across the output lines 3A and AB.

The transformer 41 has a winding 72 connected by conductors 73, 74 and resistor 75 across the armature winding 8 of the exciter 4. A control winding 76 of a carbon pile regulator 77 is connected by conductors 78, 79 and resistor 7 across the winding 8. A resistor 80 may be inserted in the conductor 79. The carbon pile regulator is illustrated diagrammatically as having an armature 81 pivoted at 82 and biased by a spring 83 in a direction to compress a stack of carbon disks 84 in opposition to the winding 76. One side of the stack 84 is connected to the conductor 78 and the other side is connected by conductor 85 to a contact 86 on relay 87 and also to a contact 88 on relay 89.

The relay 87 has a switch member 90 connected to the conductor 33 and when in the deenergized position is biased into engagement with the contact 86. Also on the relay 87 are contact 91 and associated switch member 92. A control winding 93 is connected across the output of a rectifier 94. One input terminal of the rectifier 94 is connected by a conductor 95 to the output line 3B. The other input terminal of the rectifier 94 is connected by conductor 96, resistor 97, conductor 98, resistor 99 and conductor 100 to the output line 3C. A shunt is provided for the resistor 97 by conductor 101 connected to the contact 91, switch arm 92 and conductor 102.

The relay 89 in addition to the contact 88 has a switch arm 103 and a control winding 104. The switch arm 103 in the unenergized position is biased to engage the contact 87. The winding 104 is connected by conductors 105 and 106 across the output of a rectifier 107. A resistor 108 may be inserted in the conductor 106. The input of the rectifier 107 is connected by conductors 109 and 110 across the winding 21 of the transformer 17. Also connected across the output of rectifier 107 by conductors 111 and 112 is a control winding 113 for the relay 24. A resistor 114 may be inserted in the conductor 112.

In operation, the output voltage of the generator 1 is controlled by regulating the output of the exciter 4. Output voltage is sensed by the bridge circuit 52, the output of which energizes the control winding 13 of the magnetic amplifier 11 in a direction depending upon the direction of deviation of the output voltage from a predetermined value. In addition to the main control winding, a pair of trimmer windings are provided. They are energized from an electronic sensing circuit which senses R.M.S. values and provides a highly sensitive control for the amplifier 11.

A feedback winding 16 is connected in a combination shunt feedback and stabilizing circuit. The stabilizing circuit has two transformers, the primary winding of one is connected in series with the exciter shunt field and the primary of the other across the rotating field. The secondary windings are connected in series with the feedback winding across the output rectifier of the magnetic amplifier.

In order to limit the ampere turn range required on the shunt field winding of the exciter, a bucking field winding is provided. The bucking field winding is energized from a rectifier connected to the A.C. output of the generator.

The relay 24 is provided to prevent the magnetic amplifier from going to saturation upon the removal of a short circuit on the stator of the generator or from some other transient condition. A control winding responsive to generator voltage is adjusted to actuate the relay 24 to an open circuit position upon the output voltage reaching a predetermined value to open the A.C. input to the magnetic amplifier. The A.C. voltage collapses. The starting relay 89 is then in position to give full field to the exciter and the output voltage will build up in a normal manner and the system is back to normal operating conditions.

The relay 87 provides means for limiting short circuit currents to a safe value. Upon a short circuit occurring, the voltage will collapse and the relay 87 will go to the closed position, as shown in the drawing. This will insert a carbon pile element in the shunt field circuit. The control winding of the carbon pile is connected to sense the current in the rotating field. By shunting the resistor 97, the pick up voltage for the relay 87 is lower than the dropout voltage. A ballast resistor is connected in series with the control winding to provide temperature compensation. Thus, independent of generator speed, the rotating field current is held constant and thereby keeps the short circuit current constant and within safe limits.

Although only one embodiment of the invention has been illustrated and described, various changes in the form and relative arrangement of the parts, which will now appear to those skilled in the art, may be made without departing from the scope of the invention.

What is claimed is:

1. Current limiting means for an alternating current generator having an exciting field and an output winding comprising a variable resistance element, a control winding for said element, means connecting said control winding in response to the current flowing in said exciting field, and means responsive to a condition of said output winding to insert said variable resistance element in circuit relationship with said exciting field to limit the current flowing therein.

2. Current limiting means for an alternating current generator having a separate exciter, said exciter having a shunt field winding and a rotor winding, comprising a variable resistance element, a control winding for said variable resistance element, means connecting said control winding across said rotor winding, and means responsive to a condition of said generator to connect said variable resistance element in circuit relationship with said shunt field, thereby to maintain the current in said rotor winding substantially constant.

3. The combination as set forth in claim 2 and including temperature compensating means for said control winding.

4. Short circuit current limiting means for an alternating current generator having a separate exciter, comprising a shunt field winding and an armature winding for said exciter, a carbon pile resistance element, a control winding for said carbon pile, means including a ballast resistor for connecting said control winding in response to the current flowing in said armature winding, and means responsive to a short circuit in said generator output to connect said carbon pile in series with said shunt field winding whereby the current flowing in said armature winding is held substantially constant.

References Cited in the file of this patent

UNITED STATES PATENTS

| | | |
|---|---|---|
| 1,850,449 | Creveling | Mar. 22, 1932 |
| 1,933,858 | Keller | Nov. 7, 1933 |
| 2,170,193 | Godsey | Aug. 22, 1939 |
| 2,262,359 | Exner | Nov. 11, 1941 |
| 2,426,005 | Exner | Aug. 19, 1947 |
| 2,716,213 | Neild | Aug. 23, 1955 |